Aug. 28, 1928.
H. W. ALLEN
HOT AIR GENERATOR
Filed July 19, 1926
1,682,102
2 Sheets-Sheet 2
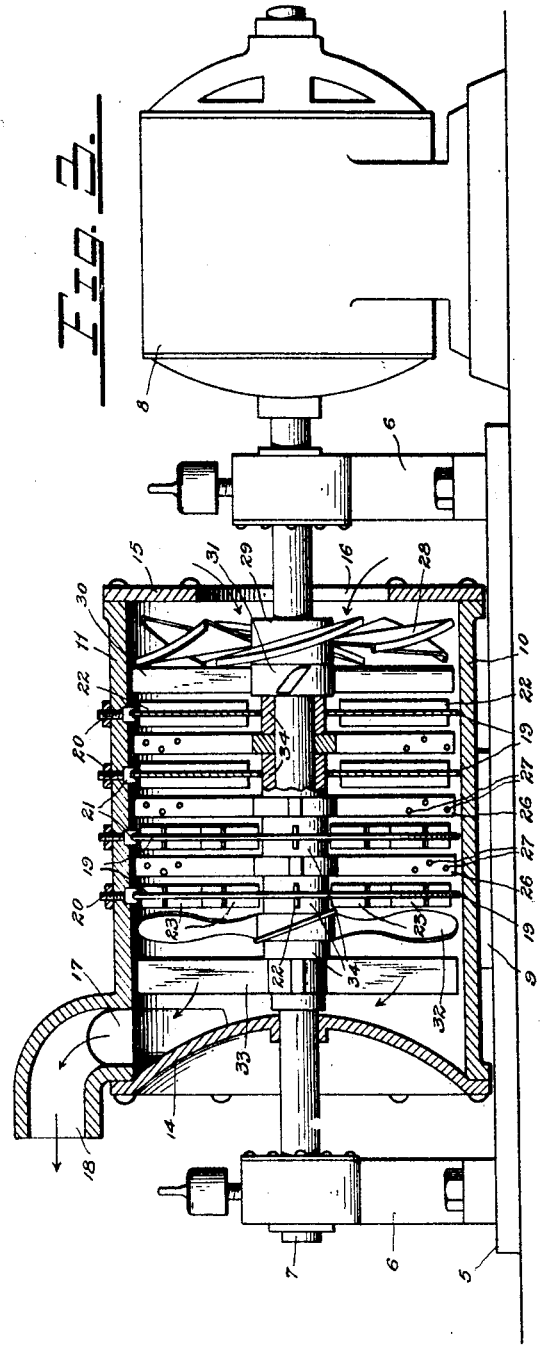
INVENTOR
*Henry W. Allen*
BY
*Frank Warren*
ATTORNEY Patented Aug. 28, 1928.

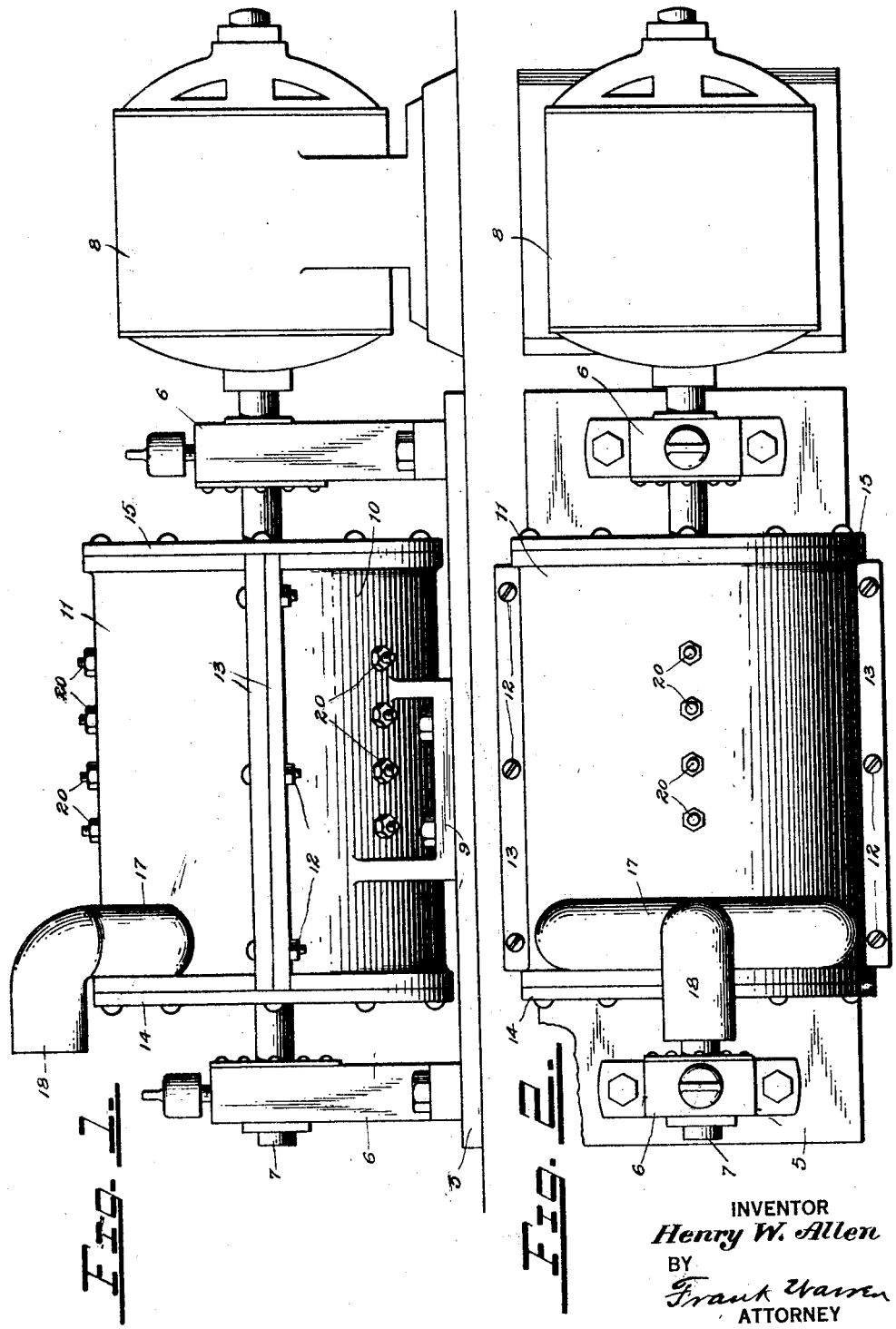

1,682,102

UNITED STATES PATENT OFFICE.

HENRY W. ALLEN, OF SEATTLE, WASHINGTON.

HOT-AIR GENERATOR.

Application filed July 19, 1926. Serial No. 123,355.

My invention relates to improvements in hot air generators and the object of my invention is to provide a hot air generator that will draw the outside air at atmospheric temparature into a casing that is provided with a plurality of stationary perforated partitions in spaced relation and which have rotary paddle wheels disposed therebetween whereby the air may be subjected to intense frictional churning thereby raising its temperature for heating purposes and when thus heated it is then forced out into a room. The device is motor driven and is provided with fans for drawing the cool air in and forcing the heated air out. It is particularly adapted for installation in the walls of buildings for supplying the interior with fresh warm air that is taken directly from outside thus serving the twofold purpose of heating and ventilating the building at one and the same time.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:

Figure 1 is a view in side elevation of a hot air generator embodying the exterior features of the invention;

Fig. 2 is a top plan view of the same;

Fig. 3 is a view of the device partly shown in section and partly in elevation;

Fig. 4 is a view in elevation of one of the perforated partition members;

Fig. 5 is a view in elevation of one of the paddle wheels;

Fig. 6 is a view in elevation of the fan for drawing air into the device.

Referring to the drawings throughout which like reference numerals designate like parts, the numeral 5 indicates a base plate upon which two standards 6 are bolted which serve as bearings for a shaft 7 that is driven by a motor 8. A casing is centrally mounted on said shaft between said standards by means of a base bracket 9 secured to said base plate and integrally formed with the lower half portion 10 of said casing.

The upper half portion 11 of said casing is secured to the lower half 10 by means of bolts 12 passing through their adjoining flanges 13. The forward or outlet end of the casing is closed by having a dished in member 14 secured thereto which fits snugly around the shaft 7. The rear or intake end of said casing has a disc member 15 secured thereto which is provided with an aperture 16 surrounding said shaft for the admission of cold air. The forward upper end of said upper half portion of the casing is provided with a manifold member 17 that connects with an outlet 18 for the outward passage of warm air.

The casing is interiorly provided with a plurality of perforated partitions 19 each of which is retained in place by three bolts 20 equally spaced and passing through the walls of said casing with their inner slotted end portions 21 engaging the edge portions of the partitions. Said partitions are each provided on both sides with four major ribs 22 disposed at right angles and a plurality of minor ribs 23 projecting therefrom. The disc portions of said partitions are relatively thin and are perforated by many small holes 24. Apertures 25 in the centers of the partitions prevent same from touching any part of the shaft 7.

Disposed between the partitions 19 are fourblade paddle wheels 26 whose hubs are keyed to the shaft 7. The blades of said wheels are provided at their end portions with perforations 27 that pass in a staggered slantwise direction through the blades. Said blades are disposed in radial alignment with said shaft and do not touch any part of the stationary partitions.

A six bladed fan 28 has its hub 29 keyed to the shaft 7 just inside the rear end of the casing adjacent the aperture 16 of the end member 15. A four blade paddle wheel 30 has its hub 31 keyed to said shaft in abutment with the hub of said fan. The blades of said paddle wheel are beveled and disposed in a slantwise direction on its hub for the purpose of propelling and churning the air at one and the same time as will be more fully hereinafter set forth.

A four bladed propeller fan 32 is keyed to the shaft 7 adjacent the forward end portion of the casing and a four bladed paddle wheel 33 is likewise keyed to said shaft between said propeller fan and the forward end closure member 14. Collars 34 are secured to the shaft and serve as spacers between the paddle wheels 26, 30 and to separate one of the wheels 26 from the propeller fan 32.

In the operation of the device the outside air at atmospheric temperature is sucked into the casing through the aperture 16 by the fan 28 which also serves to propel the air through said casing, it being understood that the motor 8 is driving the shaft 7 at many revolutions per second.

The paddle wheel 30 with the slanting blades churns the air and projects it against the ribs 22 and 23 of the first partition member 19 when it is forced through the perforations 24 therein. The air then comes in contact with the first of the paddle wheels 26 whose blades with the assistance of the slanting apertures in their end portions beat said air against the cleats of the partitions on either side until it is forced through the perforations of the next partition.

This process is repeated as the air is consecutively forced through each portion and into engagement with each of the paddle wheels until it passes through the last or forward partition where it is engaged by the propeller fan 32. Said fan forces the air outwardly and the relatively wide bladed paddle wheel 33 serves to continue the churning process while the air passes out through the manifold 17 and outlet 18.

It will thus be seen that the air in its passage through the device is subjected to intensive churning by the several rotary elements and violent agitation as it is projected against the stationary elements whereby the friction generated in the air will be sufficient to raise its temperature the required number of degrees for all practical purposes in the heating of living quarters. As the air is taken in fresh from the outside the device will also serve to ventilate the quarters at one and the same time.

Having thus described my invention, it being understood that the device shown is primarily intended for illustration and that minor changes may be resorted to without departing from its scope and spirit, what I claim and desire to secure by Letters Patent is:

1. A hot air generator comprising a casing having an air inlet and an air outlet therein, a driven shaft within said casing, a plurality of frictional means mounted within said casing, agitating means keyed to said shaft between said frictional means, and propeller fans keyed to said shaft at both ends of said casing for drawing air into and expelling it from said casing.

2. A hot air generator comprising a casing having an air inlet and an air outlet therein, a driven shaft within said casing, means for driving said shaft, spaced perforated partitions mounted within said casing, paddle wheels keyed to said shaft between said partitions, and propeller fans keyed to said shaft at both ends of the casing for drawing air into and expelling it from said casing.

3. A hot air generator comprising a casing having an air inlet and an air outlet therein, a driven shaft within said casing, means for driving said shaft, spaced perforated partitions mounted within the casing, ribs on the sides of said partitions, paddle wheels keyed to the shaft between the partitions, and propeller fans keyed to the shaft at both ends of said casing for drawing air into and expelling it from the casing.

In witness whereof, I hereunto subscribe my name this 5th day of July, A. D. 1926.

HENRY W. ALLEN.